US012200108B2

(12) United States Patent
Leker et al.

(10) Patent No.: US 12,200,108 B2
(45) Date of Patent: *Jan. 14, 2025

(54) SYSTEMS AND METHODS FOR BLOCKCHAINS WITH SERIAL PROOF OF WORK

(71) Applicant: MYDREAM INTERACTIVE, INC., Palo Alto, CA (US)

(72) Inventors: Andrew Jonathan Leker, San Rafael, CA (US); Matthew Drew Birder, San Francisco, CA (US); Allison Phuong Huynh, Palo Alto, CA (US); Mark Thomas Wallace, San Rafael, CA (US)

(73) Assignee: MYDREAM INTERACTIVE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,855

(22) Filed: May 19, 2023

(65) Prior Publication Data

US 2023/0412359 A1  Dec. 21, 2023

Related U.S. Application Data

(63) Continuation of application No. 17/317,407, filed on May 11, 2021, now Pat. No. 11,658,804, which is a
(Continued)

(51) Int. Cl.
*H04L 9/06* (2006.01)
*H04L 9/32* (2006.01)
(Continued)

(52) U.S. Cl.
CPC .......... *H04L 9/0637* (2013.01); *H04L 9/0643* (2013.01); *H04L 9/3218* (2013.01);
(Continued)

(58) Field of Classification Search
CPC ... H04L 9/0637; H04L 9/0643; H04L 9/3218; H04L 9/3239; H04L 63/00; H04L 67/104; H04L 9/50; H04L 63/126
See application file for complete search history.

(56) References Cited

U.S. PATENT DOCUMENTS 10,340,038 B2 * 7/2019 Witchey ................ G16H 10/60
11,038,669 B2 * 6/2021 Leker .................... H04L 63/126
(Continued)

FOREIGN PATENT DOCUMENTS

CN          106452785 A      2/2017

OTHER PUBLICATIONS

Mahmoody et al., "Publicly Verifiable Proofs of Sequential Work", Proceedings of the 4th conference of Innovations in Theoretical Computer Science, Jan. 9-12, 2013, pp. 373-388.

*Primary Examiner* — Baotran N To
(74) *Attorney, Agent, or Firm* — Artegis Law Group, LLP

(57) ABSTRACT

Techniques for updating blockchains using a proof of work determined serially include receiving a block of data for inclusion in a new block of a blockchain; deterministically determining an initial nonce, hashing a combination of the block of data and the initial nonce to create a hashed value; iteratively deterministically determining an updated nonce based on a combination of the hashed value and updating the hashed value by hashing the updated nonce until the updated hashed value satisfies a proof of work criteria; creating the new block based on the block of data, the initial nonce, and the updated hashed value that satisfies the proof of work criteria; and having the new block stored in the blockchain.

20 Claims, 3 Drawing Sheets

Related U.S. Application Data continuation of application No. 16/102,643, filed on Aug. 13, 2018, now Pat. No. 11,038,669.

(60) Provisional application No. 62/636,075, filed on Feb. 27, 2018.

(51) Int. Cl.
*H04L 9/40* (2022.01)
*H04L 67/104* (2022.01)
*H04L 9/00* (2022.01)

(52) U.S. Cl.
CPC ............ *H04L 9/3239* (2013.01); *H04L 63/00* (2013.01); *H04L 67/104* (2013.01); *H04L 9/50* (2022.05)

(56) References Cited

U.S. PATENT DOCUMENTS

| | | |
|---|---|---|
| 11,190,520 B2 * | 11/2021 | Mercuri .................. G06F 21/64 |
| 11,658,804 B2 * | 5/2023 | Leker ...................... H04L 63/00 |
| | | 713/150 |
| 2015/0332283 A1 * | 11/2015 | Witchey .................. G06F 21/00 |
| | | 705/3 |
| 2016/0261690 A1 | 9/2016 | Ford |
| 2017/0005804 A1 | 1/2017 | Zinder |
| 2017/0085545 A1 | 3/2017 | Lohe et al. |
| 2017/0272416 A1 | 9/2017 | Erickson et al. |
| 2018/0115425 A1 * | 4/2018 | Dechu ................... H04L 9/3239 |
| 2019/0108498 A1 | 4/2019 | Deshpande et al. |
| 2019/0268142 A1 * | 8/2019 | Leker .................... H04L 9/3218 |
| 2020/0044854 A1 | 2/2020 | Hsueh |
| 2020/0076603 A1 * | 3/2020 | Li ......................... H04L 63/123 |

* cited by examiner

SYSTEMS AND METHODS FOR BLOCKCHAINS WITH SERIAL PROOF OF WORK

CROSS-REFERENCE TO RELATED APPLICATIONS

This application is a continuation of U.S. Patent Application titled, 'SYSTEMS AND METHODS FOR BLOCKCHAINS WITH SERIAL PROOF OF WORK," filed on May 11, 2021, and having Ser. No. 17/317,407, which is a continuation of the U.S. patent application titled, "SYSTEMS AND METHODS FOR BLOCKCHAINS WITH SERIAL PROOF OF WORK," filed on Aug. 13, 2018 and having Ser. No. 16/102,643, which claims priority to U.S. Provisional Application No. 62/636,075 filed Feb. 27, 2018, entitled "SYSTEMS AND METHODS FOR BLOCKCHAINS WITH SERIAL PROOF OF WORK," the entire contents of each of which is incorporated herein by reference.

TECHNICAL FIELD

The present disclosure relates generally to securing electronic data using blockchains and more specifically to blockchains where the proof of work is determined using serial computing processes.

BACKGROUND

A blockchain is a continuously growing list of records, called blocks, which are linked and secured using cryptographic hashes. A correctly designed blockchain is inherently resistant to modification of the data in the blocks making it a useful tool for recording data, contracts, transactions, and/or the like where a high confidence in the integrity of the data is desired. A blockchain typically uses a distributed ledger that is often managed by a number of nodes in a peer-to-peer network, where each of the nodes adheres to an agreed upon protocol for validating new blocks. The nodes rely on a decentralized consensus (e.g., via Byzantine fault tolerance) to determine when a new block has been verified. Because each block in the chain is built upon the secured blocks that come before it in the chain, data within a block cannot be altered retroactively without affecting all the subsequent blocks in the blockchain. Thus, without collusion from among at least a majority of the nodes in the network, it is effectively not practical to alter the recorded data retroactively.

Accordingly, improved systems and methods for managing blockchains are desirable.

SUMMARY

According to some embodiments, a computing device includes a memory storing a blockchain, and a processor coupled to the memory. The processor is configured to receive a miner identifier, receive a block of data for inclusion in a new block of the blockchain, determine an initial nonce based on the miner identifier, hash a combination of the block of data and the initial nonce to create a hashed value, iteratively determine an updated nonce based on the hashed value and update the hashed value by hashing the updated nonce until the updated hashed value satisfies a proof of work criteria, create the new block based on the block of data, the miner identifier, and the updated hashed value that satisfies the proof of work criteria, and share the new block with one or more other computing devices hosting the blockchain.

According to some embodiments, a method performed by a computing device includes receiving a miner identifier, receiving a block of data for inclusion in a new block of a blockchain, determining an initial nonce based on the miner identifier, hashing a combination of the block of data and the initial nonce to create a hashed value, iteratively determining an updated nonce based on the hashed value and update the hashed value by hashing the updated nonce until the updated hashed value satisfies a proof of work criteria, creating the new block based on the block of data, the miner identifier, and the updated hashed value that satisfies the proof of work criteria, and sharing the new block with one or more other computing devices hosting the blockchain.

According to some embodiments, a non-transitory computer-readable medium includes a plurality of machine-readable instructions which when executed by one or more processors associated with a computing device are adapted to cause the one or more processors to perform a method. The method includes receiving a miner identifier, receiving a block of data for inclusion in a new block of a blockchain, determining an initial nonce based on the miner identifier, hashing a combination of the block of data and the initial nonce to create a hashed value, iteratively determining an updated nonce based on the hashed value and update the hashed value by hashing the updated nonce until the updated hashed value satisfies a proof of work criteria, creating the new block based on the block of data, the miner identifier, and the updated hashed value that satisfies the proof of work criteria, and sharing the new block with one or more other computing devices hosting the blockchain.

In the figures, elements having the same designations have the same or similar functions.

DETAILED DESCRIPTION

This description and the accompanying drawings that illustrate inventive aspects, embodiments, implementations, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Elements described in detail with reference to one embodiment, implementation, or module may, whenever practical, be included in other embodiments, implementations, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

In some instances, well known methods, procedures, components, and circuits have not been described in detail so as not to unnecessarily obscure aspects of the embodiments.

Figure 1:
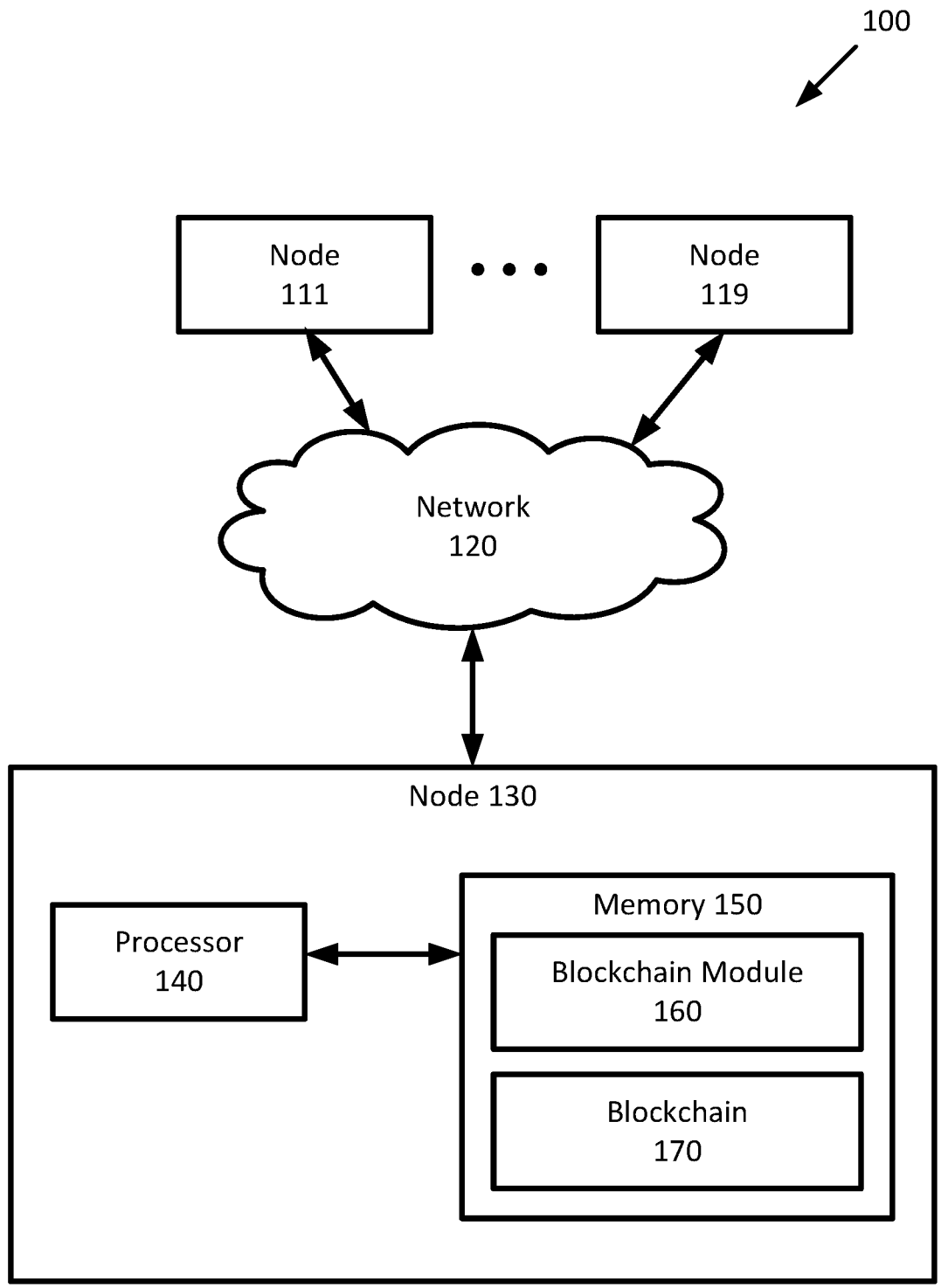
FIG. 1 is a simplified diagram of a computing environment according to some embodiments.

FIG. 1 is a simplified diagram of a computing environment 100 according to some embodiments. As shown in FIG. 1, computing environment 100 is organized as a peer-to-peer network including a plurality of nodes 111-119 and 130 coupled together by a network 120. Each of the nodes 111-119 and 130 correspond to computing devices that either form the peers in the peer-to-peer network and/or are clients that may use the services provided by the peer-to-peer network, Node 130, which is described in further detail below, may be representative of the configuration and/or capabilities of each of the nodes from nodes 111-119 that function as one of the peers in the peer-to-peer network. And although computing environment 110 is only expressly shown with three nodes (111, 119, and 130), it is understood that computing environment 100 may include any number of nodes including four, five, ten, twenty, fifty, one hundred, and/or even more nodes.

Network 120 provides connectivity and communication between nodes 111-119 and 130 allowing nodes 111-119 and 130 to exchange messages, data, blocks, blockchains, and/or the like. Network 120 may include one or more cables, connectors, and/or the like and may further include one or more network switching and/or routing devices. Network 120 may further include one or more local area networks (e.g., an Ethernet), one or more wide area networks (e.g., the Internet), and/or the like.

Referring back to node 130, node 130 is a computing device that includes a processor 140 coupled to memory 150. Operation of node 130 is controlled by processor 140. And although node 130 is shown with only one processor 140, it is understood that processor 140 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in node 130. Node 130 may be implemented as a stand-alone subsystem, a board added to a computing device, and/or as a virtual machine.

Memory 150 may be used to store software executed by node 130 and/or one or more data structures used during operation of node 130. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 150 includes a blockchain management module 160 that may be used to support blockchain operations for node 130 and/or computing environment 100. Blockchain management module 160 may additionally include one or more application programming interfaces (APIs) for sending and/or receiving data for storage in and/or retrieval from a block of the blockchain, blocks from other nodes in computing environment 100, information regarding the validation of new blocks for the blockchain, and/or the like. And although blockchain management module 160 is depicted as a software module, blockchain management module 160 may be implemented using hardware, software, and/or a combination of hardware and software.

Memory 150 further includes a blockchain 170 that is managed by blockchain management module 160 as the portion of the distributed blockchain ledger hosted by node 130. Blockchain 170 includes one or more blocks that are secured, linked, and/or validated by blockchain management module 160. In some examples, blockchain 170 may be used to record data associated with contracts, transactions, and/or the like. In some examples, blockchain 170 may be used as a basis for a crypto-currency.

One of the tasks of blockchain management module 160 is to generate a proof of work for a new block to be added to the blockchain. The mechanisms for the proof-of-work vary somewhat between different blockchains. In general, assuming that there is a collection of data that represents, for example, a transaction that is to be recorded in the blockchain, proof of work involves finding a nonce value that is added to the collection of data (e.g., by concatenation). The combined collection of data and the nonce are then processed using a one-way cryptographic hash (e.g., any of the SHA, BLACK, RIPEMD, SCRYPT, BCRYPT, and/or similar functions) with the result being a possible proof of work result. In some examples, the one-way cryptographic hash generates a deterministic and high-entropy output for a given input. A successful proof of work result is found when the output of the one-way cryptographic hash function includes a predetermined number of leading zeros. The number of leading zeros is selected so that a desired computational cost would be incurred in order to circumvent the one-way cryptographic hash. The more leading zeros that are required, the higher the computational cost. Because the cryptographic hashes are one-way, it is not computationally practical to compute the nonce from a successful proof of work result. Thus, the nonce is typically found by trying large numbers of possible nonces until one that results in a successful proof of work result for the corresponding collection of data is found. The collection of data, the nonce, and the successful proof of work result collectively become a block. In some examples, the block becomes part of a blockchain because part of the collection of data is the successful proof of work result from the previous block in the chain.

The process of searching for a suitable nonce is often referred to as mining. Mining typically involves trying a large number of random nonces to find one that results in a successful proof of work result. Thus, miners who do the searching for a suitable nonce typically use massively parallel computing resources so that they can try as many possible nonces as quickly as possible because only the nonce provided by the first successful miner is used. Thus, successful mining typically requires a large array of expensive computational resources that typically consume considerable power. This puts mining in the hands of the few who can afford the computational resources to be successful at mining.

Instead of relying on a mining approach that rewards parallel computational power, blockchain management module 160 uses an approach where mining for a suitable nonce proceeds in serial fashion and only those miners that can demonstrate that they discovered the suitable nonce in a serial fashion are rewarded for finding the suitable nonce. This is done by enforcing that each miner start with a designated initial nonce (e.g., a unique initial nonce for each authorized miner) and then use a deterministic approach for selecting the next nonce to try based on the previously tried nonce that resulted in an unsuccessful proof of work result. This serial approach provides numerous advantages over the more traditional parallel mining approach. First, because a miner is working serial and is able to try one nonce at a time, each miner is able to perform mining using a single processor that (e.g., one microprocessor, one core of a multi-core processor, and/or the like). Second, because each miner only uses a single processor, just about any computing device (e.g., PC, tablet, smart phone, and/or the like) may be used as a mining device and mining may be performed in crowd-sourced fashion by using the often idle or mostly idle processors available.

In order to prevent a miner from employing a large number of parallel processors with each of the parallel processors mining by beginning with a different designated initial nonce, each miner is preferably limited to one designated initial nonce. In some examples, each miner may be limited by using a registration process that involves periodic renewal of each miner's designated initial nonce, where the registration process involves one or more steps that cannot be automated (e.g., via a RECAPCHA or similar process). In some examples, a certificate server may be used to limit the ability of a miner to obtain more than one designated initial nonce.

According to some embodiments, the serial approach to finding the proof of work does not allow miners to apply sufficient computing power to reverse the cryptographic hash (e.g., using a quantum computer and/or the like). This is because it is not sufficient to simply reverse solve for a nonce from a proof of work result with the correct proof of work results properties as each miner must begin the serial mining process from the designated initial nonce and it would not be known which proof of work result, if any, to use that would be generated using the designated initial nonce.

Another of the tasks of blockchain management module 160 is to validate the work of other miners. When another miner claims to have found a suitable nonce for a new block to add to blockchain 170, blockchain management module 160 participates in the validation of the suitable nonce as well the validation that the suitable nonce was discovered based on the designated starting nonce for that miner and the deterministic approach for selecting each of the nonces between the designated starting nonce and the suitable nonce that yielded the successful proof of work result.

Figure 2:
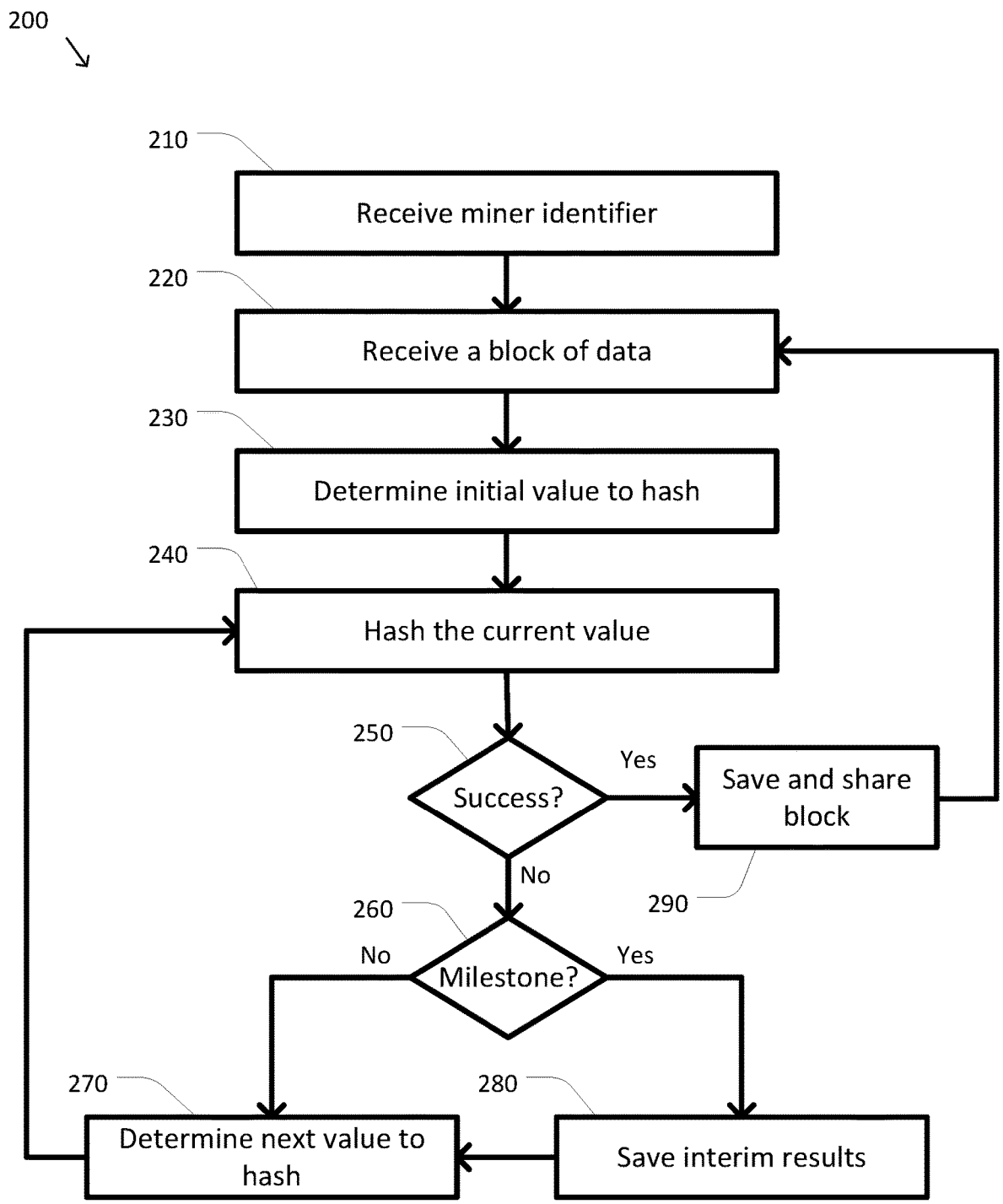
FIG. 2 is a simplified diagram of a method of performing serial proof of work according to some embodiments.

FIG. 2 is a simplified diagram of a method 200 of performing serial proof of work according to some embodiments. One or more of the processes 210-290 of method 200 may be implemented, at least in part, in the form of executable code stored on non-transitory, tangible, machine-readable media that when run by one or more processors (e.g., the processor 140 in node 130) may cause the one or more processors to perform one or more of the processes 210-290. In some embodiments, method 200 may be performed by a module, such as blockchain management module 160. In some embodiments, method 200 may be used to mine for a suitable nonce that generates a successful proof of work result for a new block in a blockchain, such a blockchain 170. And although method 200 is described in the context of determining a proof of work for a block chain, according to some embodiments, method 200 may be adapted to other applications where a search for a nonce, that when combined with a block of data and hashed, results in a hashing result meeting a predetermined criteria is desired. In some examples, method 200 may be adapted to techniques used with confidential transactions, ring signatures, proof of stake, proof of brain, and/or the like.

According to some embodiments, the order of processes 210-290 may be different than the ordering implied by the flow of FIG. 2. In some examples, processes 270 and 280 may be performed concurrently.

At a process 210, a miner identifier is received. Before a miner may participate in mining activities for the blockchain, the miner is issued a miner identifier. In some examples, each minor may be limited to a single miner identifier so that miners may not perform parallel searches for a suitable nonce for a block of data. In some examples, the miner identifier may be received as part of a periodic registration process. In some examples, the periodic registration process may include a non-automated component that restricts the ability of a miner to register for more than one miner identifier at a time. In some examples, the non-automated component may correspond to a RECAPCHA or similar mechanism used to verify that a human is performing the registration process. In some examples, the miner identifier may be received from a registration authority using a certificate service or similar to restrict individual registrants from having multiple accounts with corresponding miner identifiers. In some examples, the miner identifier may correspond to a public key, such as a unique 144 bit value issued by a key authority.

At a process 220, a block of data is received. The block of data corresponds to data that is to be secured by the blockchain. In some examples, the block of data may correspond to a transaction or other information that is to be recorded and secured in the blockchain. In some examples, the block of data may further include information from a previous block in the blockchain, such as the successful proof of work result from the previous block. In some embodiments, several working variables may be initialized when the block of data is received. In some examples, a counter indicating the number of attempts to find a successful proof of work result may be initialized to zero. In some examples, a counter indicating the number of chunks of attempts to find the successful proof of work result may be initialized to zero.

According to some embodiments, the block of data may include one or more features that allow the block of data to record data associated with contracts, transactions, cryptocurrencies and/or the like. In some examples, a length of the block of data may vary from block to block in the blockchain allowing smaller blocks of data to be recorded in the blockchain without having to wait until the block of data reaches a fixed size and/or without having to pad the block of data to a fixed size. In some examples, the data in the block of data conforms to one or more rules that place restrictions on the data in the block of data. In some examples, the block of data may include a script, executable code, and/or the like that can further process and/or enforce a transaction recorded in the block of data after the block has been added to the blockchain. In some examples, the script, executable code, and/or the like may be used to perform crowd funding where value/output is only released to a recipient when a threshold value of contributions/inputs has been reached and/or to return the contributions/inputs to the contributors if the threshold value is not reached before a deadline.

In some embodiments, the data in the block of data may be encrypted and/or salted to provide security and/or anonymity in the data and/or the entities associated with the data. In some examples, when the IP address and/or other identifier of a client requesting entry of data into the block of data is recorded in the block, the address and/or identifier may be masked by hashing it, using an anonymizing network (e.g., IP2), using stealth addresses, and/or the like. In some examples, a stealth address may be a one-time use private address that replaces a public address. In some examples, the one-time use private address may be determined using a dual-key algorithm. In some examples, the content and/or the amount of a transaction in the block of data may be hidden using confidential transactions, ring signatures, and/or the like.

At a process 230, an initial value to hash is determined. In practice, an initial nonce to be combined with the block of data received during process 220 is deterministically determined from the miner identifier received during process 210. In some examples, the initial nonce is determined as a deterministic function of the miner identifier. In some examples, the initial nonce may be determined according to Equation 1, where hash is a one-way cryptographic hash, such as SHA512 and/or the like, A is a constant value (e.g., an integer or string), and is a deterministic function, such as addition, concatenation, and/or the like. In some examples, A is zero and/or an empty string (e.g., the initial nonce is the miner identifier).

$$\text{InitialNonce} = \text{MinerID} \cdot A \qquad \text{Eq. 1}$$

Once the initial nonce is determined, it is combined with the block of data received during process 220. In some examples, the initial value is determined according to Equation 2, where DATA is the block of data received during process 220 and is a deterministic function, such as addition, concatenation, and/or the like.

$$\text{InitialValue} = \text{DATA} \cdot \text{InitialNonce} \qquad \text{Eq. 1}$$

At a process 240, the current value is hashed. The hash is a one-way cryptographic hash, such as SHA512. The current value is the initial value determined during process 230 in the first pass through process 240 and the next value determined during process 270 (described in further detail below) in subsequent passes through process 240. The result of the hash is a proof of work result as indicated in Equation 2. In some examples, the counter indicating the number of attempts to find the successful proof of work result may be incremented.

$$POW = \text{hash}(\text{CurrentValue}) \qquad \text{Eq. 3}$$

At a process 250, it is determined whether the proof of work result generated by the hash of process 240 is a successful proof of work result. The proof of work result is examined to determine how many leading zeros it contains. When the proof of work result includes a predetermined number of leading zeros, the proof of work result is a successful proof of work result. In some examples, the predetermined number of leading zeros is set to adjust the computational cost of determining a successful proof of work result and the predetermined number of leading zeros may be adjusted upward or downward to achieve a desired computational cost. When the proof of work result is a successful proof of work result, it is saved and shared using a process 290. When the proof of work result is not a successful proof of work result, additional iterations are performed beginning with a process 260.

At the process 260, it is determined whether a milestone number of attempts to find the successful proof of work result is reached. In some examples, the milestone number of attempts is a configurable number of attempts. In some examples, the milestone number of attempts is set to one million. In some examples, the determination that a milestone number of attempts is reached may be determined by comparing the counter indicating the number of attempts incremented during process 240 to the milestone number of attempts and when the counter indicating the number of attempts is equal to the milestone number of attempts then the milestone number of attempts is reached. In some examples, the milestone number of attempts is reached when the counter indicating the milestone number of attempts is evenly divisible by the milestone number of attempts. When the milestone number of attempts is reached, interim proof of work results are saved using a process 280. When the milestone number of attempts is not reached, a next value to hash is determined using a process 270.

At the process 270, the next value to hash is determined. In some examples, the next value to hash (also sometimes referred to as the next nonce value) is a function of the unsuccessful proof of work result determined during process 240. In some examples, the next value to hash is determined according to Equation 4, where POW is the unsuccessful proof of work result determined during process 240, B is an integer or string value, and is a deterministic function, such as addition, concatenation, and/or the like. In some examples, B is a constant value, such as zero, one or a designated character string. In some examples, B is a function of the counter indicating the number of attempts to find the successful proof of work result (e.g., the counter value itself or a string version of the counter value).

$$\text{NextValue} = POW \cdot B \qquad \text{Eq. 4}$$

In some examples, the next value to hash is also a function of the block of data received during process 220 according to Equation 5, where DATA is the data received during process 220, POW is the unsuccessful proof of work result determined during process 240, is a deterministic function, such as addition, concatenation, and/or the like, and C is an integer or string value similar to B from Equation 4.

$$\text{NextValue} = \text{DATA} \cdot (POW \cdot C) \qquad \text{Eq. 5}$$

In some examples, the next value to hash is determined differently after each milestone number of attempts is reached and process 270 is performed after process 280. In some examples, the next value to hash is determined according to Equation 6 or Equation 7, where DATA is the data received during process 220, POW is the unsuccessful proof of work result determined during process 240, is a deterministic function, such as addition, concatenation, and/or the like, and D is an integer or string value. In some examples, D is a constant such as zero, one, or a designated string. In some examples, D is a function of the counter indicating the number of chunks of attempts to find the successful proof of work result (e.g., the number of chunks of attempts itself or a string version of the number of chunks of attempts).

$$\text{NextValue} = POW \cdot D \qquad \text{Eq. 6}$$

$$\text{NextValue} = DATA \cdot (POW \cdot D) \qquad \text{Eq. 7}$$

Once the next value to hash is determined, the next value is hashed by returning to process 240.

At the process 280, interim results are saved. In order to facilitate the validation that the successful proof of work result was obtained according to the serial search process of method 200, interim results from the search are periodically saved for later reference. In some examples, the interim results are saved after every milestone number of attempts to find the successful proof of work result. In some examples, the saved interim results include the unsuccessful proof of work result determined during process 240. In some examples, the saved interim results further include the next value to hash to be determined during process 270 according to which one of Equations 4-7 is being used by method 200. In some examples, the counter indicating the number of attempts to find the successful proof of work results is reset to zero.

At the process 290, the results of the successful proof of work result search are saved in the block and the block is shared with the other nodes hosting the blockchain (e.g., the hosting nodes in computing environment 100) as a new block to be added to the blockchain. In some embodiments, the block that is saved and shared is consistent with block 300 of FIG. 3.

As discussed above and further emphasized here, FIG. 2 is merely an example which should not unduly limit the scope of the claims. One of ordinary skill in the art would recognize many variations, alternatives, and modifications. In some embodiments, method 200 may further include a user interface for displaying one or more interim results and/or information representative of progress toward finding a successful proof of work result. In some examples, the user interface may depict information in the form of simulated progress toward a goal (e.g., to solving a puzzle, reaching the end of a maze, and/or the like) with the progress showing an indication of proof of effort toward the successful proof of work result. In some examples, the user interface may show how close each proof of work result is to having the desired features of a successful serial proof of work result as a proxy for the proof of effort. In some examples, method 200 may be integrated with another application (e.g., a game, a web browser, an audio/video codec, and/or the like). In some examples, method 200 may use computing resources (e.g., a processor and/or a processor core) that is otherwise idle when the application is being executed. In some examples, the application may be a puzzle solver, a role-playing game, a first-person shooter, and/or the like. In some examples, in-application actions (e.g., performing actions, viewing content, completing surveys, and/or the like) reward the user with a configurable number of attempts to generate the proof of work results. In some examples, finding a successful proof of work result may be rewarded with in-application value, such as a special currency, special items, special capabilities, bonus screens, wagerable value, and/or the like.

Figure 3:
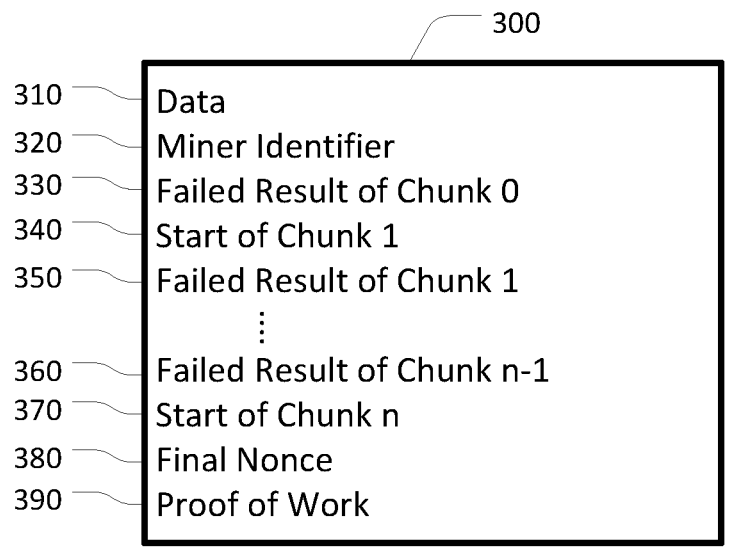
FIG. 3 is a simplified diagram of a block from a blockchain according to some embodiments.

FIG. 300 is a simplified diagram of block 300 according to some embodiments. As shown in FIG. 3, block 300 includes several fields 310-390 that record the data included in the block as well as information regarding the mining used to find the successful proof of work result. In some embodiments, one or more of fields 310-390 are optional and may be omitted. In some examples, the start of chunk fields 340 and/or 370 are optional and may be omitted.

Data field 310 includes the data that is to be recorded in block 300. In some examples, data field 310 is used to record the block of data received during process 210. In some examples, the block of data may correspond to a transaction or other information that is to be recorded and secured in the blockchain. In some examples, the block of data may further include information from a previous block in the blockchain, such as the successful proof of work result from the previous block.

Miner identifier field 320 includes the miner identifier of the miner that found the successful proof of work result. In some examples, the miner identifier is the miner identifier received during process 210. In some examples, the miner identifier is used to determine the initial nonce and the initial value that was used by the successful miner to find the successful proof of work result. In some examples, the miner identifier in miner identifier field 320 may further be used to give credit to the successful miner.

Failed result of chunk 0 field 330 includes the unsuccessful proof of work result from the last attempt to find the successful proof of work result from the first chunk of attempts (e.g., the milestone numbered attempt) saved as part of the interim results during the first pass through process 280.

Optional start of chunk 1 field 340 includes the next value determined during process 270 as the first attempt in the second chunk of attempts (e.g., the milestone number plus 1 attempt) saved as part of the interim results during the first pass through process 280.

Failed result of chunk 1 field 350 includes the last unsuccessful proof of work result from the last attempt in the second chunk of attempts (e.g., the milestone number times 2 attempt) saved as part of the interim results during the second pass through process 280.

Block 300 includes further pairs of failed results from each chuck of attempts and optionally starting next values of the next chunk of attempts. This includes a failed result of chunk n-1 field 360, which includes the result of the last complete chunk of attempts before the chunk of attempts in which the successful proof of work result was found and optionally a start of chunk n field 370, which includes the next value used to start the chunk of attempts in which the successful proof of work result was found.

A final nonce field 380 includes the final next value determined by process 270 that, when hashed during process 240, resulted in the successful proof of work result.

A proof of work field 390 includes the successful proof of work result for block 300 that includes at least the desired predetermined number of leading zeros.

As discussed above and further emphasized here, FIGS. 2 and 3 are merely examples which should not unduly limit the scope of the claims. One of ordinary skill in the art would recognize many variations, alternatives, and modifications. According to some embodiments, method 200 and block 300 may be adapted to support sub-mining where sub-miners work under the direction of a host miner. In some examples, the host miner may provide sub-mining through a service running on one or more servers (e.g., a web server) that provide content and/or other services (e.g., performing actions, viewing content, completing surveys, and/or the like) that are accessed as a pre-condition to performing sub-mining activity. In some examples, miner identifier field 320 may be modified so that it records the miner identifier for both the host miner and the sub-miner that discovered the successful proof of work result as detected by that sub-miner's process 250 and shared with the host miner by that sub-miner's process 290. In some examples, miner identifier field 320 may further include a flag to indicate whether sub-mining was used (with two miner identifiers stored) or only host mining (with one host miner identifier) stored. In some examples, each sub-miner's process 230 may be modified to determine the initial nonce as a deterministic function of both the host miner identifier and the sub-miner identifier. In some examples, each sub-miner's process 230 may be further modified to determine the initial nonce as a further function of the data to be secured in the block. In some examples, the initial nonce may be determined according to Equation 8, where hash is a one-way cryptographic hash, such as SHA512 and/or the like, E and F are integer or string constants, and is a deterministic function, such as addition, concatenation, and/or the like. In some examples, both E and F are zero or a designated string.

$$\text{InitialNonce} = \text{hash}(\text{BlockData} \cdot \text{hostMinerID} \cdot E) + \text{subMinerID} \cdot F \quad \text{Eq. 8}$$

According to some embodiments, other one-way cryptographic hash functions may be used for any of the hash functions described in Equations 1-8. In some examples, the same hash function may be used for Equations 1-8. In some examples, the other possible hash functions include MD5, SHA-0, SHA-1, SHA-2, SHA-3, SHA-256, RIPEMD, RIPEMD-128, RIPEMD-160, BLAKE, BLAKE2, SCRYPT, BCRYPT, and/or the like.

Once a miner finds the successful proof of work result and shares the potential new block (e.g., block 300) with the other nodes hosting the blockchain, the other nodes validate that the shared successful proof of work result is a successful proof of work result for the block of data in the block and further that the successful proof of work result was obtained via a serial search. In some embodiments, each of the nodes hosting the blockchain may validate the results by repeating each of the attempts in each of the chunks of attempts that the successful miner used to arrive at the final nonce and the successful proof of work result. In general, however, this may include more computation than is strictly necessary to reasonably validate the successful search result.

In some embodiments, each of the nodes hosting the blockchain may be assigned a specific sub-portion of the search. In some examples, the sub-portion of the search that each node validates may be assigned in a deterministic method (e.g., via round robin and/or other similar assignment process). In some examples, the sub-portions may include validation of a designated number of chunks of attempts. In some examples, the sub-portions may be assigned so that each chunk of attempts is validated by a configurable number of nodes (e.g., each chunk of attempts may be validated by one, two, three, four, or more nodes). In some examples, different nodes validate different subsets of the chunks of attempts. In some examples, no two nodes validate the same subset of the chunks of attempts. In some examples, each of the nodes also validates the final chunk of attempts in which the successful proof of work result was found.

In some embodiments, validation of the successful proof of work result search may be performed via a random sampling approach where each of the nodes hosting the blockchain validates a random sub-portion (e.g., a random subset of the chunks of attempts) of the search. This reduces the overall computational burden on each of the nodes hosting the blockchain. If each of the nodes hosting the blockchain validates its own random portion of the search and sufficient numbers of nodes are used, a high confidence can be achieved that each of the sub-portions (e.g., each of the chunks of attempts) is validated at least once by one of the nodes and/or by a desired number of nodes. In some examples, a desired confidence value may be used to determine how many sub-portions each of the nodes validates.

Figure 4:
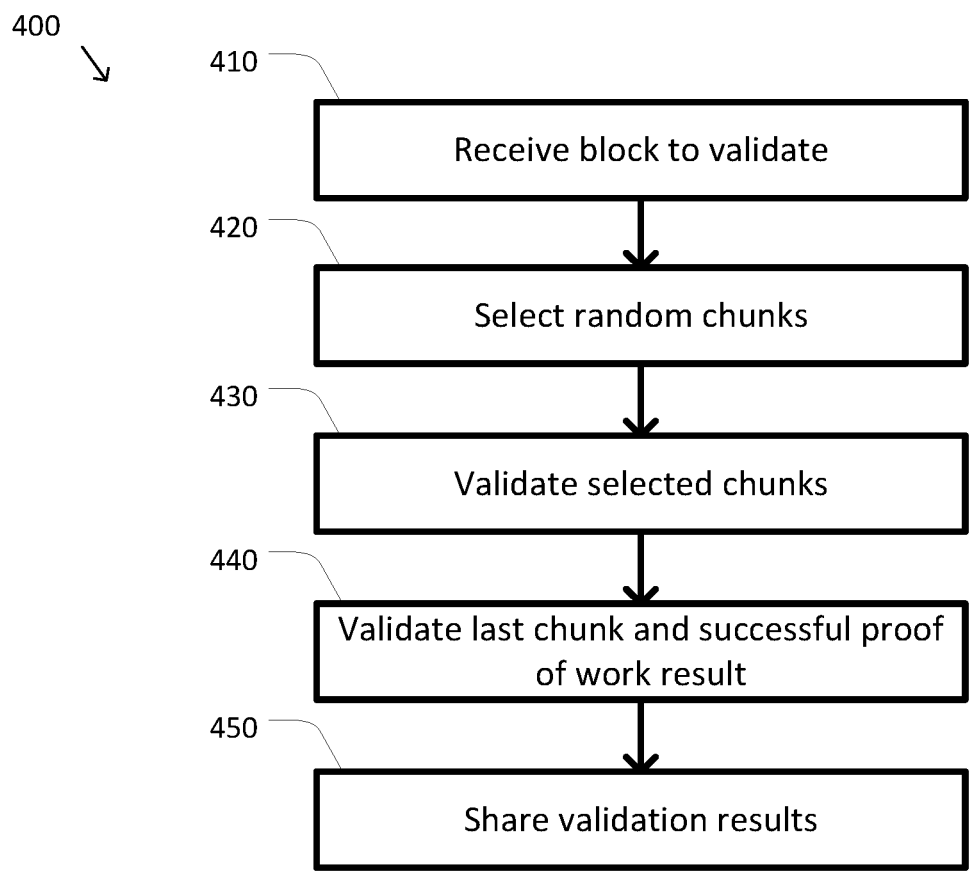
FIG. 4 is a simplified diagram of a method of validating a serial proof of work according to some embodiments.

FIG. 4 is a simplified diagram of a method 400 of validating a serial proof of work according to some embodiments. One or more of the processes 410-450 of method 400 may be implemented, at least in part, in the form of executable code stored on non-transitory, tangible, machine-readable media that when run by one or more processors (e.g., the processor 140 in node 130) may cause the one or more processors to perform one or more of the processes 410-450. In some embodiments, method 400 may be performed by a module, such as blockchain management module 160. In some embodiments, method 400 may be used by each of the nodes, (e.g., any of nodes 110-119 and/or 130) hosting a blockchain to validate a portion of a reported search for a successful proof of work result, such as a search result shared by a miner using process 290. In some embodiments, the node corresponding to the successful miner does not perform method 400. In some embodiments, the validation is performed on a block that includes information and/or fields consistent with block 300.

According to some embodiments, the order of processes 410-450 may be different than the ordering implied by the flow of FIG. 4. In some examples, processes 420 and 430 may be performed concurrently with each chunk of attempts to validate being selected after the previous chunk of attempts to validate has been validated.

At a process 410, a block to validate is received. In some examples, the block to validate may be consistent with block 300. In some examples, the block to validate may be received from a node corresponding to a successful miner.

At a process 420, a configurable number of chunks of attempts are selected randomly for validation. In some examples, the number of chunks of attempts to validate is determined based on a number of chunks of attempts in the block received during process 410. In some examples, the number of chunks of attempts to validate is determined based on a number of nodes that are participating in the validation of the block received during process 410. In some examples, the number of chunks of attempts to validate is determined so as to obtain a desired confidence level that each of the chunks of attempts in the block is validated by at least one of the nodes and/or by a desired number of nodes. In some examples, the algorithm used to seed the random selection of the chunks of attempts to validate may yield a different seed for each of the nodes. In some examples, the seed may be determined based on the miner identifier assigned to the respective node.

At a process 430, each of the chunks of attempts selected during process 420 is validated. In some examples, each respective one of the chunks of attempts is validated by beginning with the initial value from the corresponding start of chunk field (e.g., from start of chunk i field when validating chunk of attempts i) and repeating the iterations of processes 240 and 270 and verifying that the final proof of work result from the milestone numbered attempt matches the unsuccessful proof of work result from the corresponding failed result of chunk field (e.g., failed result of chunk i field when validating chunk of attempts i). In some examples, the initial value is determined using process 270 from the unsuccessful proof of work result from the previous chunk of attempts (e.g., from failed result of chunk i-1 when validating chunk of attempts i). In some example, the initial value when validating chunk of attempts 0 is determined using process 230 from the miner identifier field and the data field of the block.

At a process 440, the last chunk of attempts and the successful proof of work are validated. In some examples, the initial value of the last chunk of attempts is determined from the start of the last chunk field (e.g., start of chunk n field 370) and/or from the failed result of the last unsuccessful chunk of attempts field (e.g., failed result of chunk n-1 field). The iterations of processes 240 and 270 are then repeated until the final nonce is obtained (e.g., from final nonce field 380) and the successful proof of work result (e.g., from proof of work field 390) is determined from the final nonce.

At a process 450, the results of the validation are shared. If the node was able to validate each of the randomly selected chunks of attempts and the final chunk of attempts along with the final nonce and successful proof of work, the node indicates that the block received during process 410 is validated. If validation of any of the chunks of attempts or the final chunk of attempts with the final nonce and successful proof of work fails, the node indicates that it has not validated the block received during process 410. The nodes then use the results of their decentralized consensus policy to determine whether the new block is considered to be successfully added to the blockchain. What a consensus is reached the new block is added to the blockchain. In some examples, the decentralized consensus policy may use a Byzantine fault tolerance approach. In some embodiments, a variant of process 450 may be used where the results of the validation are shared by the node by adding or not adding the new block to the blockchain.

As discussed above and further emphasized here, FIGS. 2 and 4 are merely examples which should not unduly limit the scope of the claims. One of ordinary skill in the art would recognize many variations, alternatives, and modifications. In some embodiments, methods 200 and/or 400 may be adapted to regulate a number of new blocks that are added to the blockchain, a rate at which new blocks may be added to the blockchain, and/or the like. In some examples, the rate at which new blocks are added to the blockchain may be fixed and/or set to a value that adapts based on patterns in how often new blocks are available to be added to the blockchain. In some examples, the adaptation may include increasing the rate at which new blocks are added to the blockchain according to an arithmetic, a geometric, and/or other type of progression. In some examples, a maximum number of blocks in the blockchain may be regulated. In some examples, the maximum number of blocks in the blockchain may be fixed and/or adapted over time. In some examples, the maximum number of blocks in the blockchain may be adapted according to an arithmetic, a geometric, and/or other type of progression.

According to some embodiments, methods 200 and/or 400 may be modified so that a successful proof of work result found within a configurable number of iterations from the initial nonce is not considered acceptable as a successful proof of work result, but rather a second successful proof of work result following additional iterations is considered the correct mining result. In some examples, this provides additional protection against a system that is able to reverse the computations of the cryptographic hash.

Some examples of the systems and methods described herein may include non-transient, tangible, machine readable media that include machine-readable instructions that when run by one or more processors (e.g., processor 140) may cause the one or more processors to perform methods 200 and/or 400 as described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for updating a blockchain, the method comprising:
   receiving a block of data for inclusion in a new block of a blockchain;
   deterministically determining an initial nonce;
   hashing a combination of the block of data and the initial nonce to create a hashed value;
   iteratively deterministically determining a next nonce based on the hashed value and updating the hashed value by hashing a combination of the next nonce and the block of data until the updated hashed value satisfies a proof of work criteria;
   creating the new block based on the block of data and the updated hashed value that satisfies the proof of work criteria; and
   having the new block stored in the blockchain.

2. The computer-implemented method of claim 1, wherein deterministically determining the initial nonce comprises deterministically determining the initial nonce from a miner identifier.

3. The computer-implemented method of claim 1, wherein having the new block stored in the blockchain comprises sharing the new block with one or more other computing devices hosting the blockchain.

4. The computer-implemented method of claim 1, wherein updating the hashed value by hashing the next nonce comprises hashing a combination of the block of data and the next nonce.

5. The computer-implemented method of claim 1, wherein the proof of work criteria is a predetermined number of leading zeros in the updated hashed value.

6. The computer-implemented method of claim 1, further comprising:
   counting a number of times a hashed value is determined; and
   every predetermined number of times a hashed value is determined, saving interim results from the hashing.

7. The computer-implemented method of claim 6, wherein the interim results from the hashing is an updated hashed value that does not meet the proof of work criteria.

8. The computer-implemented method of claim 1, further comprising:
   receiving a first block from another computing device;

randomly selecting a subset of interim results included in the first block;

validating the subset of interim results; and reporting results of the validation to each of one or more other computing devices; and adding the first block to the blockchain based on reaching a consensus with the one or more other computing devices that the new block should be added to the blockchain.

9. The computer-implemented method of claim 1, wherein:

the block of data includes one or more encrypted items; or the block of data conforms to one or more rules; or the block of data includes a script or executable code.

10. One or more non-transitory computer-readable storage media including instructions that, when executed by one or more processors, cause the one or more processors to perform the steps of:

receiving a block of data for inclusion in a new block of a blockchain;

deterministically determining an initial nonce;

hashing a combination of the block of data and the initial nonce to create a hashed value;

iteratively deterministically determining a next nonce based on the hashed value and updating the hashed value by hashing a combination of the next nonce and the block of data until the updated hashed value satisfies a proof of work criteria;

creating the new block based on the block of data and the updated hashed value that satisfies the proof of work criteria; and having the new block stored in the blockchain.

11. The one or more non-transitory computer-readable storage media of claim 10, wherein deterministically determining the initial nonce comprises deterministically determining the initial nonce from a miner identifier.

12. The one or more non-transitory computer-readable storage media of claim 10, wherein having the new block stored in the blockchain comprises sharing the new block with one or more other computing devices hosting the blockchain.

13. The one or more non-transitory computer-readable storage media of claim 10, wherein updating the hashed value by hashing the next nonce comprises hashing a combination of the block of data and the next nonce.

14. The one or more non-transitory computer-readable storage media of claim 10, wherein the steps further comprise:

counting a number of times a hashed value is determined; and every predetermined number of times a hashed value is determined, saving interim results from the hashing.

15. The one or more non-transitory computer-readable storage media of claim 14, wherein the interim results from the hashing is an updated hashed value that does not meet the proof of work criteria.

16. The one or more non-transitory computer-readable storage media of claim 10, wherein the steps further comprise:

receiving a first block from another computing device from one or more other computing devices;

randomly selecting a subset of interim results included in the first block;

validating the subset of interim results; and reporting results of the validation to each of one or more other computing devices; and adding the first block to the blockchain based on reaching a consensus with the one or more other computing devices that the new block should be added to the blockchain.

17. A computing device comprising:

one or more memories storing an application; and one or more processors coupled to the one or more memories and, when executing the application perform steps comprising:

receiving a block of data for inclusion in a new block of a blockchain;

deterministically determining an initial nonce;

hashing a combination of the block of data and the initial nonce to create a hashed value;

iteratively deterministically determining a next nonce based on the hashed value and updating the hashed value by hashing a combination of the next nonce and the block of data until the updated hashed value satisfies a proof of work criteria;

creating the new block based on the block of data and the updated hashed value that satisfies the proof of work criteria; and having the new block stored in the blockchain.

18. The computing device of claim 17, wherein iteratively determining the next nonce is performed when the one or more processors are otherwise idle.

19. The computing device of claim 17, wherein the steps further comprise displaying, on a user interface, information indicating progress toward determining the updated hashed value that satisfies the proof of work criteria.

20. The computing device of claim 17, wherein:

the steps are performed based on activity in another application; and the steps further comprise receiving a reward from the another application in response to determining the updated hashed value that satisfies the proof of work criteria.

* * * * *